(12) United States Patent
Hanyu

(10) Patent No.: US 8,020,159 B2
(45) Date of Patent: Sep. 13, 2011

(54) SYSTEM AND APPARATUS FOR AND METHOD OF DOWNLOADING A PROGRAM, IMAGE FORMATION APPARATUS, AND COMPUTER PRODUCT

(75) Inventor: Yoshiaki Hanyu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1357 days.

(21) Appl. No.: 11/586,569

(22) Filed: Oct. 26, 2006

(65) Prior Publication Data

US 2007/0044097 A1 Feb. 22, 2007

Related U.S. Application Data

(63) Continuation of application No. 10/003,286, filed on Dec. 6, 2001, now Pat. No. 7,131,124.

(30) Foreign Application Priority Data

Dec. 7, 2000 (JP) .................................. 2006-372992

(51) Int. Cl.
*G06F 9/45* (2006.01)
(52) U.S. Cl. ........................................................ 717/178
(58) Field of Classification Search .................... 717/178
See application file for complete search history.

(56) References Cited

U.S. PATENT DOCUMENTS

| | | | |
|---|---|---|---|
| 5,594,903 A | 1/1997 | Bunnell et al. | |
| 5,666,293 A | 9/1997 | Metz et al. | |
| 5,815,722 A | 9/1998 | Kalwitz et al. | |
| 5,940,627 A | 8/1999 | Luciani et al. | |
| 5,978,855 A | 11/1999 | Metz et al. | |
| 6,289,510 B1 * | 9/2001 | Nakajima | 717/170 |
| 6,343,379 B1 | 1/2002 | Ozawa et al. | |
| 6,359,570 B1 * | 3/2002 | Adcox et al. | 340/902 |
| 6,470,496 B1 * | 10/2002 | Kato et al. | 717/173 |
| 6,539,474 B2 * | 3/2003 | Matsuura | 713/2 |
| 6,615,404 B1 * | 9/2003 | Garfunkel et al. | 717/173 |

FOREIGN PATENT DOCUMENTS

| | | |
|---|---|---|
| EP | 0 848 341 | 6/1998 |
| EP | 0918 287 | 5/1999 |
| JP | 07-073042 | 3/1995 |
| JP | 08-101794 | 4/1996 |
| JP | 08-123235 | 5/1996 |
| JP | 08-166883 | 6/1996 |
| JP | 08-305561 | 11/1996 |
| JP | 11-184708 | 7/1999 |

* cited by examiner

*Primary Examiner* — John Chavis
(74) *Attorney, Agent, or Firm* — Oblon, Spivak, McClelland, Maier & Neustadt, L.L.P.

(57) ABSTRACT

Programs for executing downloading of a program are stored in an area, i.e a non-rewritable boot area, of a rewritable flash EEPROM. Control programs for the apparatus are stored in the remaining area of the EEPROM. The programs for executing the downloading of the program, which are in the boot area, will not be lost, even if a power disconnection occurs during rewriting of the control program(s) and thus redownloading can be carried out. Information, regarding whether the downloading has failed or how far the program has been downloaded before it failed, is stored. Redownloading can be executed automatically when the power is turned on based on the stored information.

11 Claims, 11 Drawing Sheets

SYSTEM AND APPARATUS FOR AND METHOD OF DOWNLOADING A PROGRAM, IMAGE FORMATION APPARATUS, AND COMPUTER PRODUCT

CROSS REFERENCES TO RELATED APPLICATIONS

This application is a continuation of U.S. application Ser. No. 10/003,286, filed on Dec. 6, 2001 which is based upon and claims the benefit of priority from Japanese Patent Application No. JP 2000-372992, filed Dec. 7, 2000, the entire contents of all of which are incorporated herein by reference.

FIELD OF THE INVENTION

This invention relates to a system and apparatus for and a method of downloading a program from a host computer, an image formation apparatus utilizing the system, and a computer readable recording medium that stores programs for executing the method on a computer.

BACKGROUND OF THE INVENTION

An information apparatus such as the printer and the copier is equipped with a group of control programs for executing control of the operation of the apparatus. These programs are generally called a "firmware" in that they lie somewhere between a hardware and a software. It is not as easy to change or modify these programs, as it is to upgrade a program in an information apparatus such as the personal computer.

Thus, the only way to change or modify the "firmware" conventionally, was to remove the EPROM (erasable and programmable read only memory) which is on the board inside the apparatus such as the printer or the copier and stores the control programs, and replace the EPROM with another EPROM that stores new control programs.

However, replacing the ROM is troublesome in that the housing of the apparatus has to be removed. As a result, a new method has become more popular, which is a method of storing the control programs beforehand onto an EEPROM (electrically erasable and programmable read only memory) that is electrically rewritable byte by byte or onto a flash EEPROM that is rewritable by all bits or block by block, and, if an update is required, obtaining the latest program(s) from, an IC card installed in an IC card slot, or a host computer connected via a network such as the Internet.

In this method, firstly the CPU in the apparatus reads the programs stored for example in the flash EEPROM out onto a RAM and executes them sequentially to clear the programs stored in the flash EEPROM. Secondly, new control programs are received from an IC card or a host computer and written onto the cleared flash EEPROM.

Examples of the above method are disclosed in the Japanese Laid-Open Patent Publications Nos. 07-073042, 08-101794, 08-123235, 08-166883, 08-305561, and 11-184708.

Unfortunately, in the above-described conventional method, if there is a system crash due to an electric power failure or because the power is turned off by mistake, after erasing the programs in the flash EEPROM and before writing a program onto the flash EEPROM completely to the end, the once cleared flash EEPROM is left with no program or at least no complete program.

The only way to fix the system crash is to get a technical service man to replace the flash EEPROM directly mounted on the board, together with the board itself. This results in extra costs, which are spent on the service and components required for the replacement, also at the cost of not being able to use the apparatus while the system is out of order.

SUMMARY OF THE INVENTION

It is an object of the present invention to provide a system and apparatus for and a method of downloading a program, an image formation apparatus utilizing the system, and a computer readable recording medium that stores programs for executing the method on a computer, which solves the problems in the conventional technique. That is, it is an object of this invention to provide a technology in which even if the power is accidentally turned off during downloading of a program, downloading of the program can be automatically restarted to be completed when the power is turned on the next time.

The word, "downloading", used below refers broadly to processes including a process of receiving a program, and also a process of rewriting the existing program stored in the flash EEPROM to replace the program with the new program received.

The system for downloading a program for download according to one aspect of the present invention comprises a host computer that includes a transmission unit which transmits the program for download, and an apparatus that downloads the program for download transmitted from the host computer. The apparatus includes a first recording section that is writable and rewritable with the program for download, a second recording section, provided in a predetermined area of the first recording section, which already stores at least a program for executing reception of the program for download and a program for executing writing of the program for download onto the first recording section, a receiving unit which receives the program for download according to the program for executing reception that has been stored in the second recording section, and a writing unit which writes the received program for download onto the first recording section according to the program for executing writing that has been stored in the second recording section. Rewriting of the programs stored in the second recording section is inhibited.

The method of downloading a program for download according to another aspect of the present invention comprises receiving the program for download from the host computer according to a program that is for executing reception of the program for download and stored in a second recording section provided in a predetermined area of a first recording section that is writable and rewritable with the program for download and already stores at least the program for executing the reception and a program for executing writing of the program for download onto the first recording section, and writing the received program for download onto the first recording section, according to the program for executing the writing that has been stored in the second recording section. Rewriting of the programs stored in the second recording section is inhibited.

The computer readable recording medium according to still another aspect of the present invention stores instruction which when executed on a computer realize the method according to the present invention.

Thus, according to the present invention, the program for executing reception of the program for download will not be erased even if the program for download stored in the first recording section is erased because of overwriting of a newly downloaded program for download.

Other objects and features of this invention will become apparent from the following description with reference to the accompanying drawings.

DETAILED DESCRIPTIONS

Embodiments of a system and apparatus for and a method of downloading a program from a host computer, an image formation apparatus utilizing the system, and a computer readable recording medium that stores programs for executing the method on a computer, according to the present invention will be explained in detail while referring to accompanying drawings.

Figure 1:
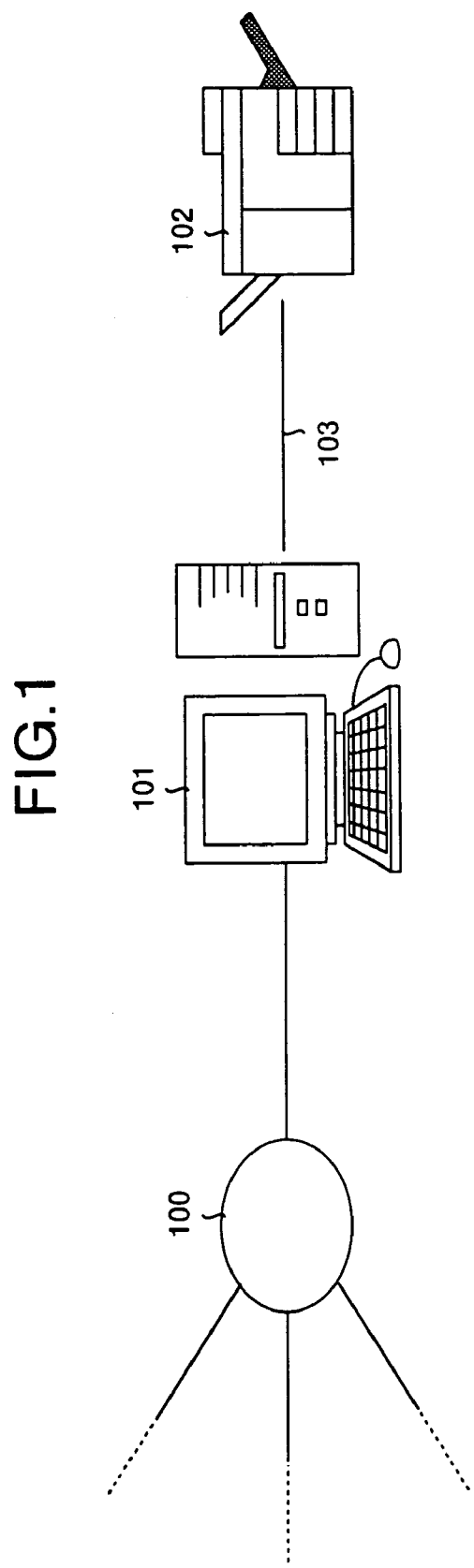
FIG. 1 is a schematic diagram, which shows a configuration of a system for downloading a program according to a first embodiment.

Firstly, a system configuration of a system for downloading a program according to the present invention will be described. FIG. 1 is a schematic diagram, which shows a system configuration of a system for downloading a program according to a first embodiment. In the figure, the reference numeral 100 represents a network, more specifically the WWW or a LAN, which is connected to a host computer 101.

The host computer 101 transmits various instructions including a printing instruction, data of a document to be printed, data of a new control program, and the like, to a later-described printer 102. The document and program to be transmitted are those created in the host computer 101 or received from another computer or the like via the network 100.

A printer driver compatible with the type of the printer 102 is already installed in the host computer 101. A program in the printer driver causes the host computer 101 to communicate with the printer 102, and unify the data format of the document to be sent, the data represented in a page description language such as PostScript.

The printer 102 interprets the data of the document, which is received from the host computer 101, one by one, creates a bitmapped image which is then output onto a paper according to a specified printing setting. Further, as will be explained in detail later, the control program(s) already stored in a flash EEPROM or the like is rewritten to be replaced by a new control program(s) received from the host computer 101.

The network 103 employed in the example explained below which connects the host computer 101 and the printer 102 is specifically a LAN such as Ethernet. However, the host computer 101 and the printer 102 may otherwise be locally connected together with a general purpose Centronics interface I/F cable, a USB cable, or the like.

Figure 2:
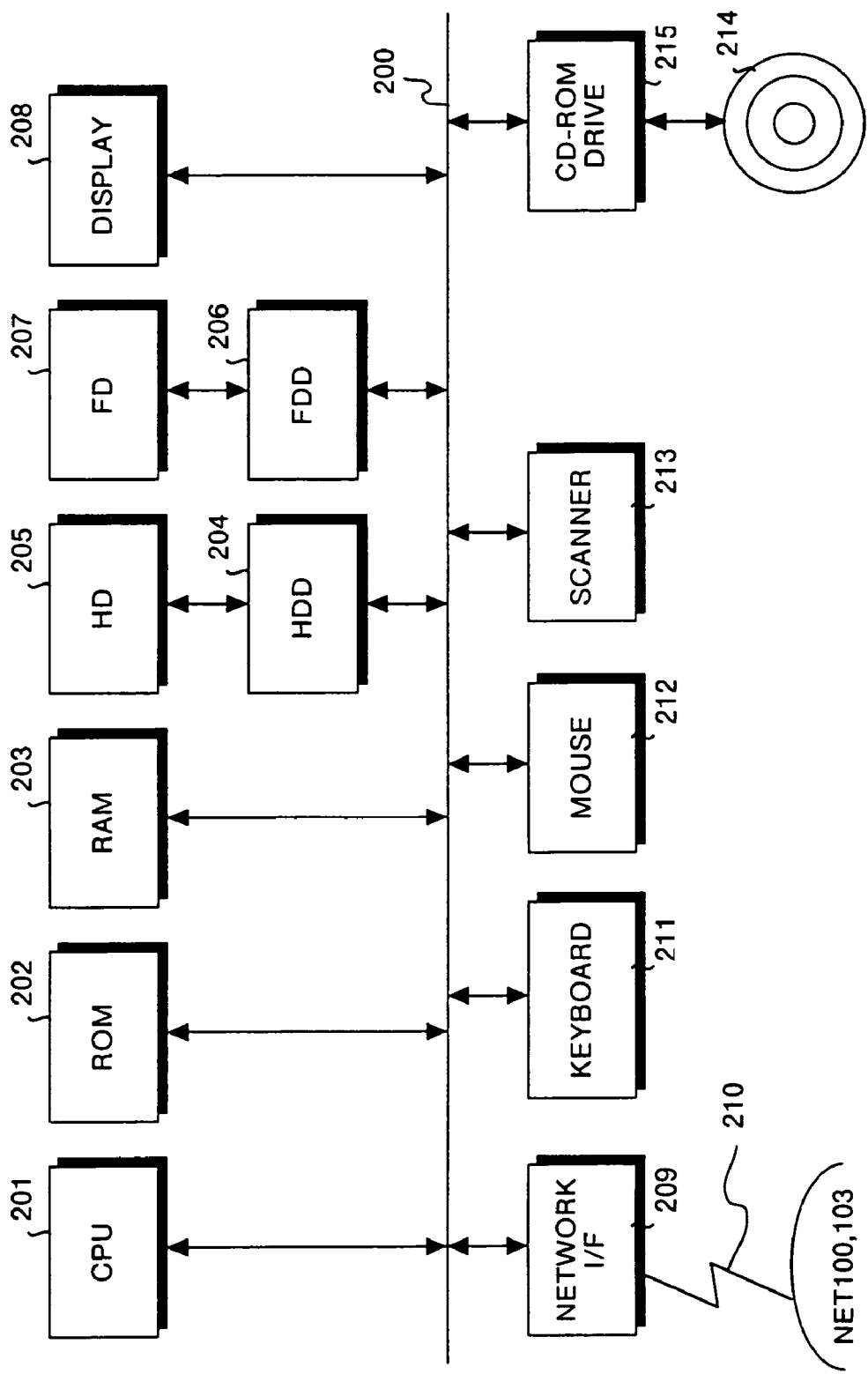
FIG. 2 is a schematic diagram, which shows a hardware configuration of a host computer 101 according to the first embodiment.

Secondly, a hardware configuration of the host computer 101 and the printer 102 composing the system for downloading a program according to an embodiment of the invention will now be explained. FIG. 2 is a schematic diagram, which shows the hardware configuration of the host computer 101 according to the first embodiment.

In FIG. 2, a CPU 201 controls the whole operation of the host computer 101, a ROM 202 stores a basic input/output program, and a RAM 203 is used as a work area of the CPU 201.

An HDD (hard disc drive) 204 controls the read/write of data onto an HD (hard disc) 205 according to the control by the CPU 201, and the HD 205 stores the data written, according to the control by the HDD 204.

An FDD (floppy disc drive) 206 controls the read/write of data onto an FD (floppy disc) 207 according to the control by the CPU 201, and the FD 207, which is removable, stores the data written, according to the control by the FDD 206.

A display 208 displays a cursor, menus, windows, and various data such as texts and images, and a network I/F 209, is connected with the networks 100 and 103 via a communication cable 210 such as a twisted pair cable and functions as an interface between the CPU and each of the networks.

A keyboard 211 has a plurality of keys for inputting texts, numeric data, various instructions, and the like, and with a mouse 212, selection and execution of various instructions, selection of a step to be processed, movement of the cursor, or the like can be carried out. A scanner 213 optically reads the texts and images, a CD-ROM 214 is a removable recording medium, a CD-ROM drive 215 controls reading of the CD-ROM 214, and a bus or cable 200 connects these components.

Figure 3:
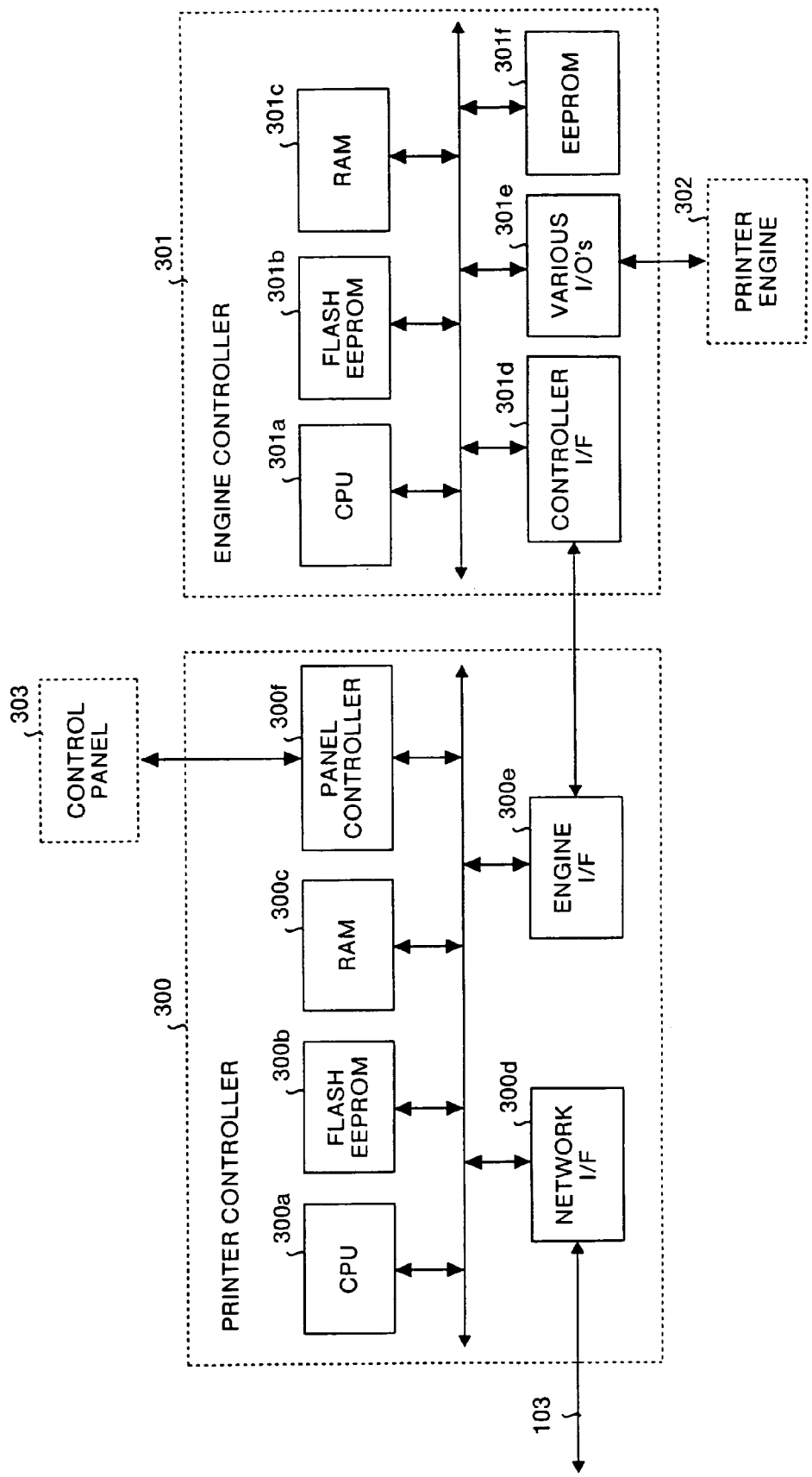
FIG. 3 is a schematic diagram, which shows a hardware configuration of a printer according to the first embodiment.

FIG. 3 is a schematic diagram, which shows a hardware configuration of the printer 102 according to the first embodiment. In FIG. 3, a printer controller 300 receives a document data from the host computer 101, creates a bitmapped image per band or page, and sends the image to a later-described engine controller 301. In addition, the printer controller 300 transfers the control program received from the host computer to the engine controller 301.

The printer controller 300 comprises a CPU 300a, a flash EEPROM 300b, a RAM 300c, a network I/F 300d, an engine I/F 300e, and a panel controller 300f. The CPU 300a controls the whole operation of the printer controller 300.

The flash EEPROM 300b stores various programs, which are read out onto the RAM 300c to be executed by the CPU 300a. These programs include a program for creating the bitmapped images of the document data received from the host computer 101, a program for receiving a new control program from the host computer 101 and transferring the new control program to the engine controller 301, a program for controlling the operation of a later-described control panel 303, and an emulation software for making the printer 102 compatible with other types of machines or products made by other companies.

The RAM 300c is used as a working memory of the CPU 300a, the working memory which reads out and executes the program(s) stored in the flash EEPROM 300b or as a paged memory for holding the document data received from the host computer 101 and the bitmapped image created by the host computer 101.

The network I/F 300d works as an interface, which controls the communication with the host computer 101 connected via the network 103, more precisely, with the network I/F 209 in the host computer 101. The engine I/F 300e works as an interface, which controls the communication with the engine controller 301, more precisely, with the controller I/F 301d in the engine controller 301.

When one of the keys on the control panel 303 is pressed, the panel controller 300f outputs an instruction, to the CPU 300a, which corresponds to the key, for example, an instruction to download a new control program. Conversely, the control panel 303 can be controlled to display on its display various error messages such as "paper jammed", "toner ended", or the like, various status messages such as "printing", "standby for printing", "updating control program", "update of control program completed", or the like, or various set values of the printer 102.

The engine controller 301 controls the operations of respective components of the printer engine 302 to execute the actual printing on paper. A latent image to be printed is formed, on a photosensitive body through an emission of a laser beam, according to the bitmapped image transmitted from the printer controller 300. After that, a toner that has been charged is adhered onto the latent image, and a sheet of paper is conveyed such that the toner image is transferred and fixed onto the sheet.

The engine controller 301 comprises a CPU 301a, a flash EEPROM 301b, a RAM 301c, a controller I/F 301d, an I/O 301e, and an EEPROM 301f. The CPU 301a controls the whole operation of the engine controller 301.

The flash EEPROM 301b stores a program that is read out by the RAM 301c and executed by the CPU 301a. The entire area consisting the EEPROM 301b includes a non-erasable and non-writable boot area, which is in a lower level than a particular address and stores a group of programs for executing downloading of a new control program into the boot area.

More specifically, the boot area stores, (1) a program receiving program for receiving a control program transmitted from the printer controller 300, (2) a flash EEPROM erasing program for erasing the contents of the area other than the boot area of the flash EEPROM 301b, and (3) a flash EEPROM writing program for writing the control program received with the program receiving program, onto the erased area of the flash EEPROM 301b, the area of which the contents have been erased with the flash EEPROM erasing program.

The area excluding the boot area stores a group of control programs for executing on respective parts of the printer engine, individual processes such as paper feeding, light emission, image formation, and the like required in printing. These control programs stored in the area excluding the booth area can be updated through a later-described downloading process.

The RAM 301c is used as a working memory of the CPU 301a for reading out and executing a program stored in the flash EEPROM 301b, and a paged memory for holding the bitmapped image received from the printer controller 300.

The controller I/F 301d is an interface, which controls its communication with the printer controller 300, more precisely, with the engine I/F 300e in the printer controller 300. Various I/O 301e refers to all the I/O's each controlling the respective part of the printer engine 302 according to the instructions from the CPU 301a. For example, the various I/O's 301e include a circuit for driving the motor of the printer engine 302, a circuit for detecting the end of a toner from a sensor in the printer engine 302, and the like.

The EEPROM 301f is a memory, which stores various set values of the printer engine 302. The various set values include, for example, quantity of laser emission, heating temperature during fixing of the toner, charging bias, and the like. Data can be erased and written byte by byte from the EEPROM 301f.

Figure 4:
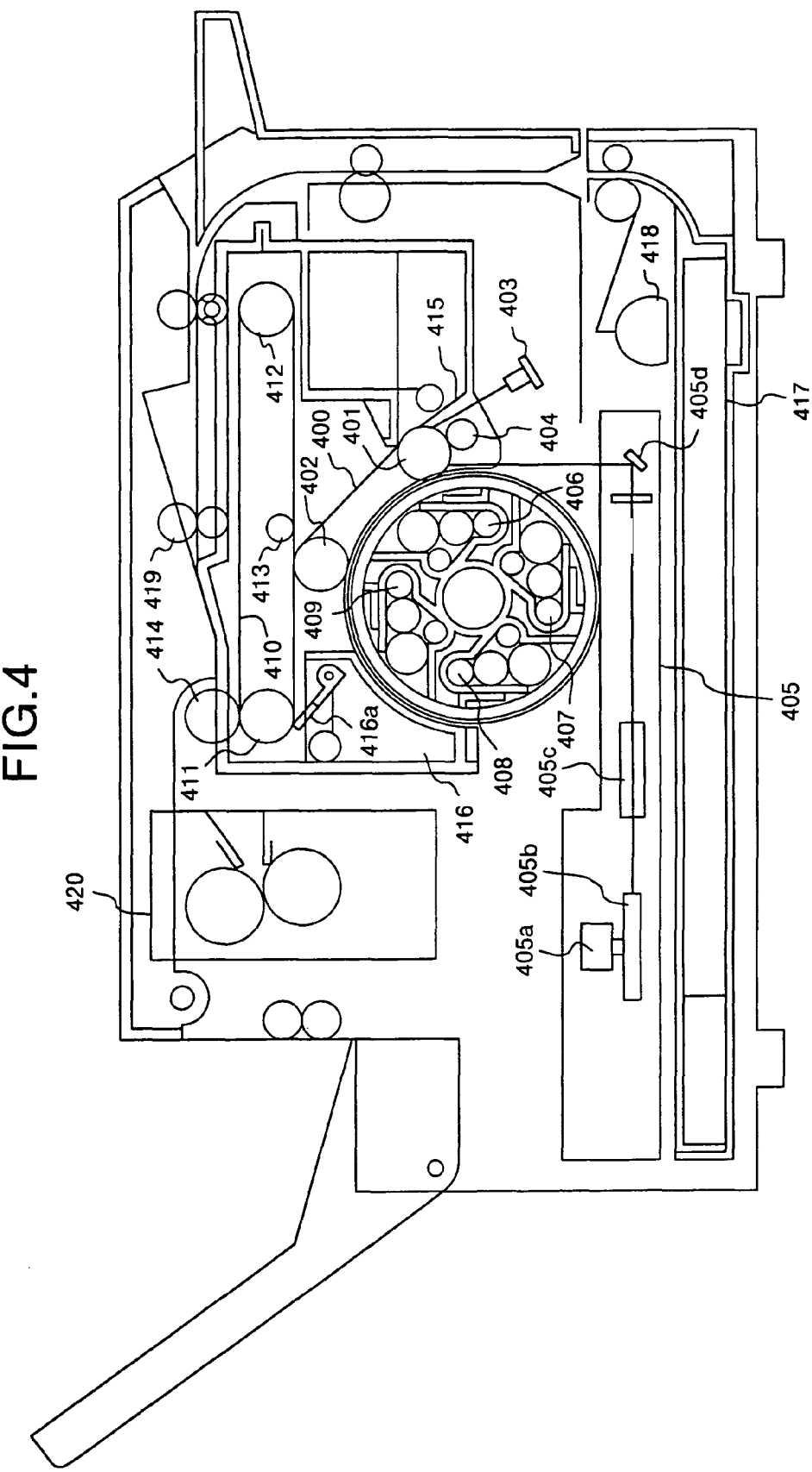
FIG. 4 is a schematic diagram, which shows a specific configuration of a printer engine 302 of the printer 102 according to the first embodiment.

The printer engine 302 carries out the actual printing procedure according to the control by the engine controller 301. FIG. 4 is a schematic diagram, which shows a specific structure of the printer engine 302 according to the first embodiment. In the figure, the numeral 400 indicates a flexible belt-shaped photosensitive body, which is an image-carrying member (recording medium). The belt-shaped photosensitive body 400 is placed around rotating rollers 401, 402, which are driven to rotate the photosensitive body 400 clockwise.

A discharge lamp 403 discharges the belt-shaped photosensitive body 400. A charging member 404 charges the belt-shaped photosensitive body 400 and is placed opposite to the rotating roller 401, which is one of the rotating rollers 401, 402 around which the belt-shaped photosensitive body is placed.

A laser writing unit 405 is contained in a housing, which is provided with a slit-shaped aperture on the top face for exposure and equipped inside the apparatus main body. A laser beam generated by a semiconductor laser not shown in the diagram, is firstly deflected by a polygon mirror 405b rotated by a drive motor 405a, passes through an fθ lens 405c, and then deflected by a mirror 405d.

The peripheral surface of the belt-shaped photosensitive body 404 discharged beforehand by the discharging lamp 403 and then charged by the charging member 404 is exposed with the laser beam. As a result, respective latent images of yellow, magenta, cyan, and black are formed in sequence. A light emission section integrated with a convergent transmission body may be used as the laser writing unit 405.

A rolling development unit comprises development devices 406, 407, 408, and 409, each containing a yellow, magenta, cyan, or black toner respectively. Each of the development devices 406 to 409 has a development sleeve that is adjacent to or contacts the belt-shaped photosensitive body at a predetermined position and can develop the latent image on the belt-shaped photosensitive body 400 by a non-contact development method or a contact development method.

An intermediate transfer belt 410 is a transferred image carrying member (recording medium) which is placed around rotating rollers 411 and 412 and driven by a bias roller 413 to be rotated anticlockwise. The belt-shaped photosensitive body 400 and the intermediate transfer belt 410 are in contact with the rotating roller 402. A transfer process is carried out such that the first latent image on the belt-shaped photosensitive body 400 is transferred onto the intermediate transfer belt 410 by the bias roller 413. The same process is repeated to transfer the second, the third and the fourth latent images onto the intermediate transfer belt 410 such that the latent images are accurately superimposed on top of each other.

A transfer roller 414 is in contact with the intermediate transfer belt 410. A cleaning device 415 of the belt-shaped photosensitive body 400 is provided opposite to the rotating roller 401. A cleaning device 416 of the intermediate transfer belt 410 has a blade 416a that contacts the surface of the intermediate transfer belt 410 and that is pressed onto the surface only when cleaning is carried out after the image transfer.

A paper feed tray 417, a paper feed roller 418 and a resisting roller 419 convey a transfer paper to the transfer roller 414. A fixing device 420 heats up the transfer paper onto which the toners have been adhered to melt and fix the toners.

FIG. 3 will be described in more detail. The control panel 303 comprises various input keys and a liquid crystal display, and under the control of the panel controller 300f, receives instructions via the input keys from an operator, displays preset messages and various set values on the liquid crystal display.

Figure 5:
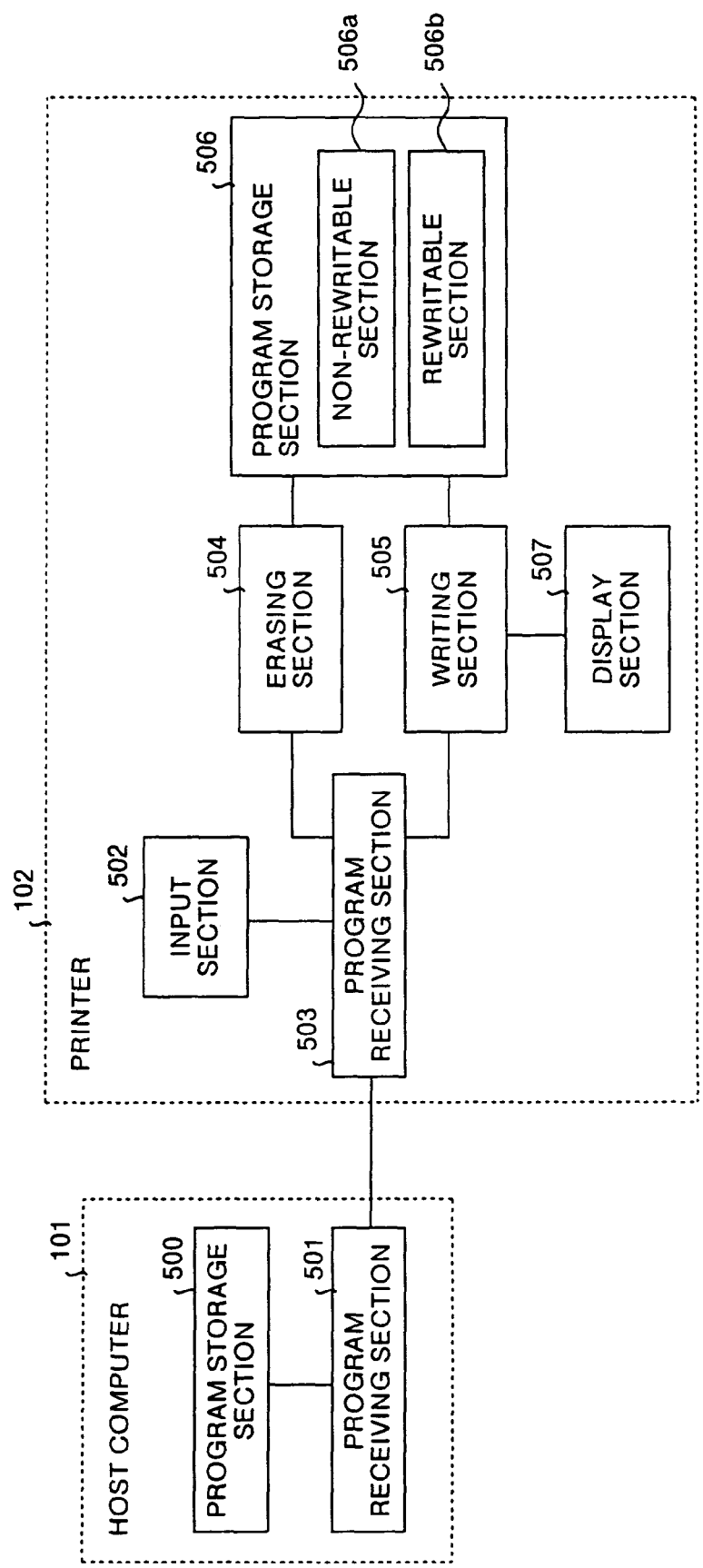
FIG. 5 is a schematic diagram, which shows functional configurations of the host computer 101 and the printer 102 according to the first embodiment.

Thirdly, a functional configuration of the host computer 101 and the printer 102 composing the system for downloading a program according to the embodiment of the invention will now be explained. FIG. 5 is a schematic diagram, which shows a functional configuration of the host computer 101 and the printer 102, according to the first embodiment. In the figure, only functional components involved in downloading of a program are shown omitting other functional components.

A program storage section 500 of the host computer 101 stores a new control program to be downloaded onto the printer 102. An HD 205 of the host computer 101 function as the program storage section 500.

A program transmission section 501 of the host computer 101 transmits the control program stored in the program storage section 500 to a later-described program receiving section 503 of the printer 102. Components of the host computer 101, which are the RAM 203 loaded with a printer driver that corresponds with the printer 102, the CPU 201 that executes a program loaded on the RAM 203, and a network I/F 209 that transmits specified data upon instruction from the CPU 201, function as the program transmission section 501. This program transmission section 501 corresponds to a "transmission unit" claimed.

An input section 502 of the printer 102 receives various instructions for the printer 102 from an operator, for example, an instruction to download a new control program, and transfers the instruction to the appropriate functional component. The CPU 300a, the RAM 300c, the panel controller 300f, and the control panel 303, of the printer controller 300, function as the input section 502.

A program receiving section 503 of the printer 102 receives the control program transmitted from the program transmission section 501 of the host computer 101. The CPU 300a, the RAM300c, the network I/F 300d, and the engine I/F 300e, of the printer controller 300, and the CPU 301a, the RAM 301c, and the controller I/F 301d, of the engine controller 301, function as the program receiving section 503. The program receiving section 503 corresponds to the "receiving unit" claimed, and the process of receiving corresponds to the "receiving step" claimed.

An erasing section 504 of the printer 102, clears a particular area of the later-described program storage (recording) section 506, that is, erases the contents of the rewritable section 506b. The RAM 301c loaded with a program for erasing the flash EEPROM and the CPU 301a for executing the program loaded on the RAM 301c, of the engine controller 301, function as the erasing section 504. This erasing section 504 corresponds to the "erasing unit" claimed, and the process of erasing corresponds to the "erasing step" claimed.

A writing section 505 of the printer 102 writes the control program received by the program receiving section 503 onto a particular area of the later-described program storage (recording) section 506, that is, onto the rewritable section 506b. The RAM 301c loaded with a program for writing on the flash EEPROM and the CPU 301a that executes the program loaded on the RAM 301c, of the engine controller 301, function as the writing section 505. This writing section 505 corresponds to the "writing unit" claimed and the process of writing is the "writing step" claimed.

The program storage (recording) section 506 of the printer 102 stores (records) various programs that are loaded onto the RAM 301c and executed by the CPU 301a. The flash EEPROM 301b functions as the program storage (recording) section 506.

The program storage (recording) section 506 comprises the non-rewritable section 506a that cannot be cleared by the erasing section 504 nor written onto by the writing section 505, and the rewritable section 506b that can be cleared and written onto on the contrary. The above-described boot area of the flash EEPROM 301b functions as the non-rewritable section 506a while the area excluding the boot area functions as the rewritable section 506b.

Therefore, the non-rewritable section 506a stores the group of programs for executing downloading of a new control program, which are, the program for receiving a program, the program for clearing the flash EEPROM, the program for writing onto the flash EEPROM, and the like, while the rewritable section 506b stores the group of control programs for controlling the respective components of the printer engine 302.

The non-rewritable section 506a corresponds to the "second recording section" claimed and the program storage (recording) section 506 corresponds to the "first recording section" claimed.

A display section 507 of the printer 102 can display on a liquid crystal display, various set values and the present status of the printer 102, and the type of error if there is an error. The CPU 300a, the RAM 300a, the panel controller 300f, and the control panel 303, of the printer controller 300, function as the display section 507.

Fourthly, steps of a procedure for downloading a new control program onto the printer 102 from the host computer 101 according to the embodiment of the invention will now be explained. In other words, steps of a procedure for updating the existing control program in the program storage (recording) section 506 with a new control program in the program storage section 500, or more particularly, steps of a procedure for updating the old control program stored in the flash EEPROM 301b in the engine controller 301 of the printer 102 with the new control program stored in the HD 205 of the host computer 101, will be explained.

Figure 6:
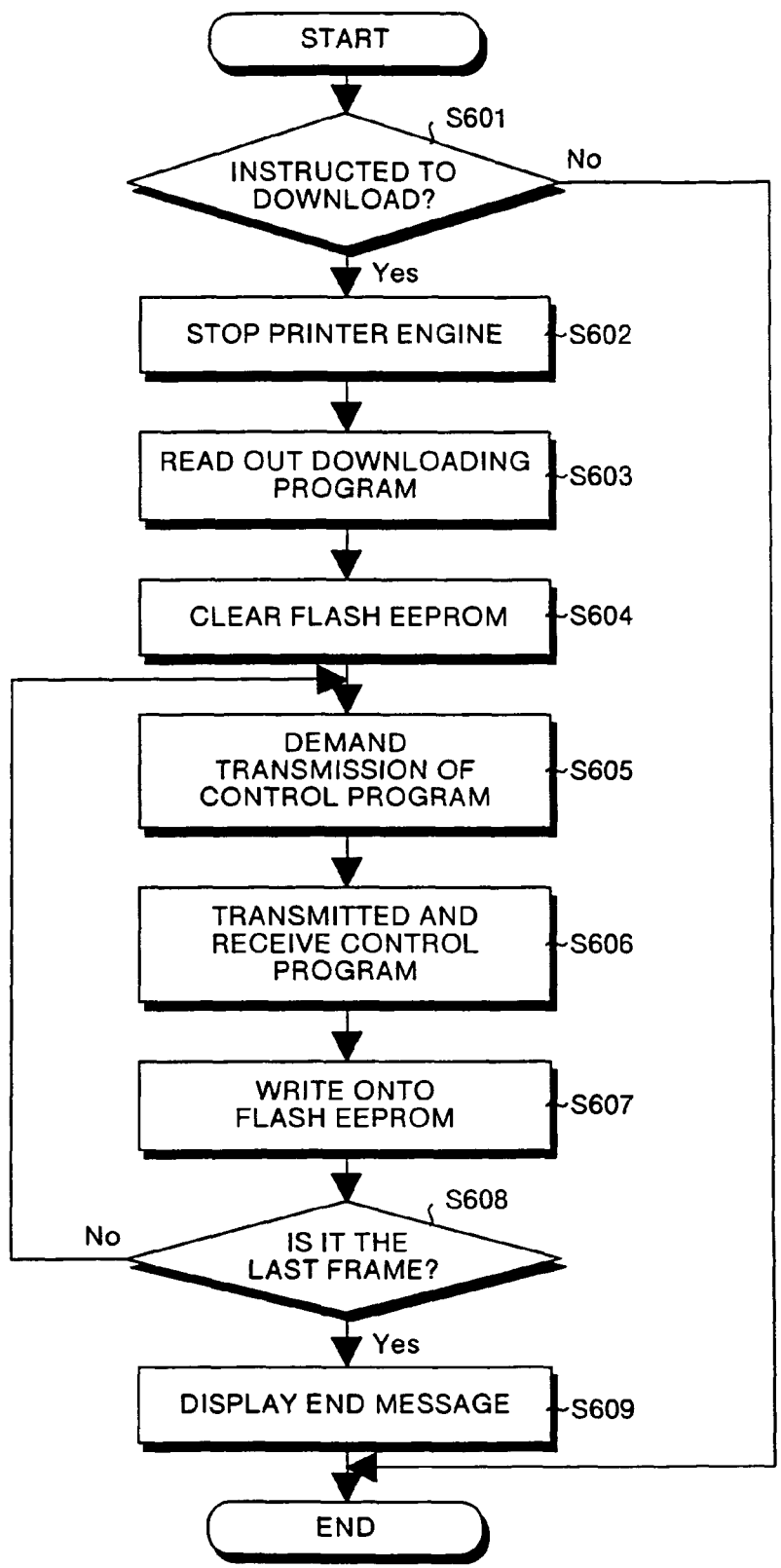
FIG. 6 is a flowchart, which shows steps of a procedure for downloading a program from the host computer 101 to the printer 102 according to the first embodiment.

FIG. 6 is a flowchart, which shows steps of a procedure for downloading a program onto the printer 102 from the host computer 101 according to the first embodiment. The program storage section 500 is assumed to already store the control program to be downloaded, at the time the procedure shown in FIG. 6 is started.

In step S601, the input section 502, more specifically, the CPU 300a of the printer controller 300, determines whether the instruction input from the control panel 303 via the panel controller 300f is an instruction to download the control program from the host computer 101. In other words, the input section 502 determines whether it is instructed to update the control program in the printer 102.

If it is instructed to download the control program (i.e. if step S601=Yes), the CPU 300a proceeds to step S602, and if the instruction is not the one to download the control program (i.e. if step S601=No), the procedure shown in the flowchart ends.

In step S602, the CPU 301a of the engine controller 301 terminates the operation of each component of the printer engine 302 via the various I/O 301e respectively. For example, the CPU 301a stops the rotations of the motors that drives various rollers, turns off the power of the heater for fixing the toner, and so on. In other words, the CPU 301a turns off the entire load working on the printer engine 302.

In step S603, the program receiving section 502, the erasing section 504, and the writing section 505 read out the respective program necessary for their operations, from the non-rewritable section 506a of the program storage (recording) section 506. More specifically, the CPU 301a of the engine controller 301 copies the program for receiving a program, the program for clearing the flash EEPROM, and the program for writing onto the flash EEPROM, which are stored in the boot area of the flash EEPROM 301b, onto the RAM 301c.

In step S604, the erasing section 504, more specifically, the CPU 301a of the engine controller 301, clears the rewritable section 506b of the program storage (recording) section 506, that is, erases the contents of the area excluding the boot area of the flash EEPROM 301b, according to the program for clearing the flash EEPROM, the program which has been read out onto the RAM 301c in the step S603.

In step S605, the program receiving section 503 demands the program transmission section 501 to transfer the control program stored in the program storage section 500 according to the program for receiving a program, the program which has been read out in the step S603. More specifically, the CPU 301a of the engine controller 301 outputs to the CPU 300a of the printer controller 300 via the controller I/F 301d and the engine I/F 300e, the demand for a transmission, and the CPU 300a then transfers the demand to the CPU 201 of the host computer 101 via the network I/F's 300d and 209.

In step S606, the program transmission section 501, which receives the demand for a transmission from the program receiving section 503, transmits the control program stored in the program storage section 500 to the program receiving section 503. More specifically, the CPU 201 of the host computer 101 reads out onto the RAM 203 the control program to be downloaded from the HD 205 or the like, and sends the program frame by frame to the CPU 300a of the printer controller 300 via the network I/F's 209 and 300d of the host computer 101 and the printer 102.

The CPU 300a then transmits the control program received, to the CPU 301a of the engine controller 301 via the engine I/F 300e and the controller I/F 301d.

In step S607, the writing section 505, more specifically, the CPU 301a of the engine controller 301, sequentially writes the frame received by the program receiving section 503 in step S606, onto the rewritable section 506b of the program storage (recording) section 506, that is, onto the area excluding the boot area of the flash EEPROM 301b, which has been cleared by the erasing section 504 in step S604, according to the program for writing onto the flash EEPROM, the program which has been read out onto the RAM 301c in step S603.

In step S608, the program receiving section 503 determines whether the frame received is the last frame. If it is the last frame (i.e. step S608=Yes), step S609 is reached, while if it is not (i.e. step S608=No) the CPU 301a proceeds to the step S605 to demand for a transmission of the next frame.

In step S609, the display section 507, more specifically, CPU 300a of the printer controller 300, displays via the panel controller 300f an end message such as "update of program completed" which has been stored in the flash EEPROM 300b beforehand, on the display of the control panel 303. Finally, the procedure shown in the flowchart is completed.

If, for example, the power supply is turned off by a blackout or the like during the steps S604 to S608, only the incompletely downloaded control program or no control program exists in the area at a higher level than a particular address in the flash EEPROM 301b. If this happens, the components of the printer engine 302 can no longer be controlled.

However, the program for receiving a program, the program for clearing the flash EEPROM, the program for writing onto the flash EEPROM, and the like, which are stored in the area at the lower level than the particular address in the flash EEPROM 301b, more specifically in the boot area, still exist since they are not erased. Therefore, when the CPU 301a of the engine controller 301 is instructed to redownload the control program after the system recovers, the CPU 301a loads the program for receiving a program, and the like, from the flash EEPROM 301b onto the RAM 301c, and obtains the new control program from the host computer 101 such that the new program can be written onto the flash EEPROM 301b. Of course, after that, the operation of the printer engine 302 can be controlled in accordance with the new program.

As explained above, according to the first embodiment, even if there is a system crash during an update of a control program and the control program in the printer 102 is erased or damaged, the new control program can be downloaded from another computer or the like using a minimum of programs left in the predetermined area of the flash EEPROM 301b. Therefore it is not required, to replace the flash EEPROM, which has only lost the contents and not mechanically damaged at all, or to replace the whole board with the flash EEPROM mounted on it. As a result, wasting of time and financial cost can be avoided to a great extent.

In the first embodiment, although one flash EEPROM is used with itself divided into a non-rewritable and a rewritable sections, a non-rewritable ROM storing the group of programs for executing downloading and a rewritable flash EEPROM storing the group of control programs for the printer engine, may be used instead.

However, it should be noted that if the programs for executing downloading are stored in the rewritable flash EEPROM, like in the first embodiment, the programs can be updated with new programs just like the control programs for the printer engine, in an exceptional case such as when any bugs in these programs are found. Moreover, according to the first embodiment, there is no extra rise in the cost since it is not required to provide a separate ROM on a board, while downloading can be achieved successfully with the hardware similar to the conventional technology.

In the first embodiment, if updating of the control programs is abnormally ended by a power disconnection, the operator must give an instruction via the control panel of the printer to redownload after the power is turned on, that is, after the system recovers. However, re-updating may also be automatically executed after the system recovers if an update abnormally ends, like in a second embodiment described below.

A configuration of a system for downloading a program according to the second embodiment will not be explained in detail because it is similar to that of the first embodiment shown in FIG. 1. In addition, hardware structures of the host computer 101 and the printer 102 composing the system will not be explained in detail because they are similar to those shown in FIGS. 2, 3, and 4.

Figure 7:
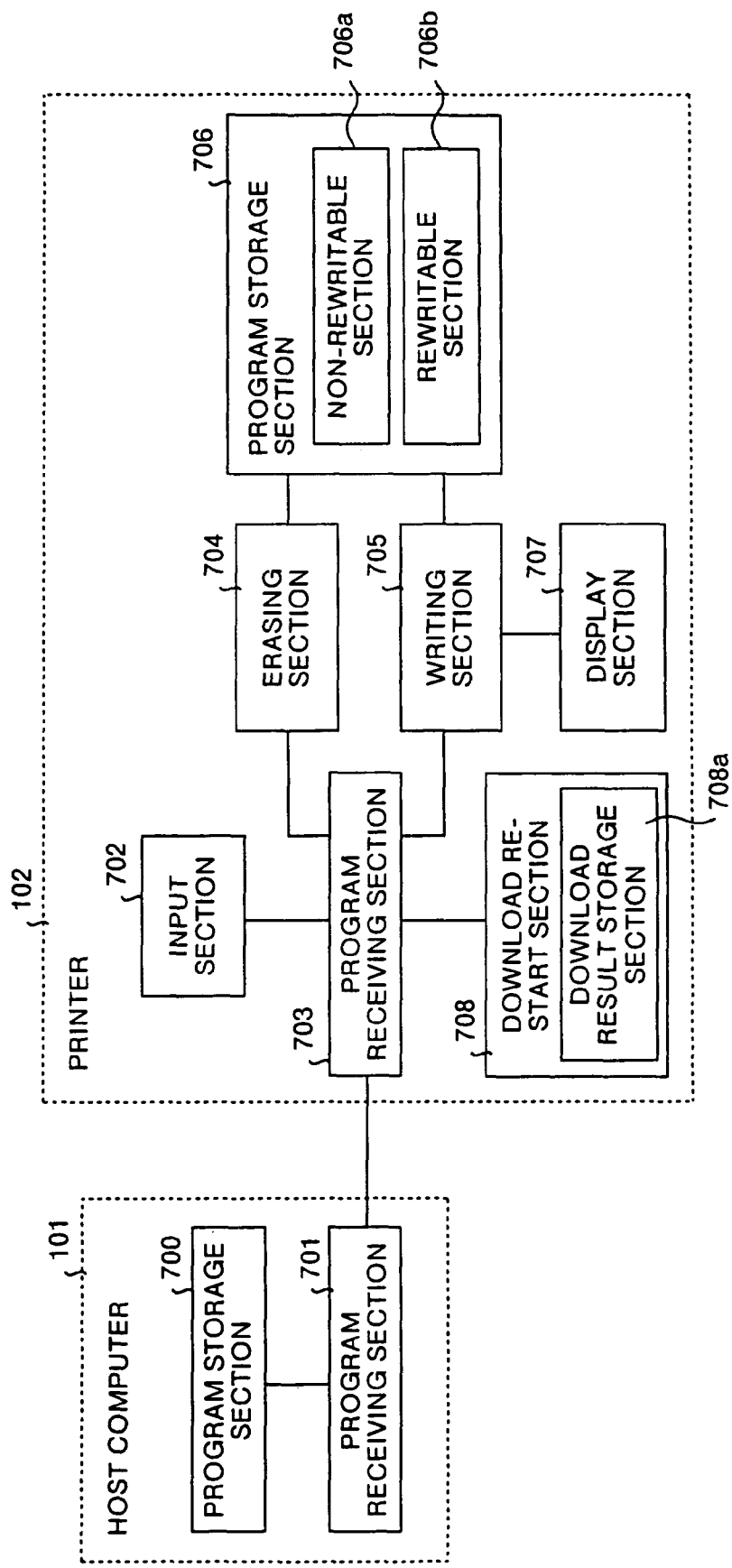
FIG. 7 is a block diagram showing a functional configuration of a system for downloading a program according to a second embodiment.

A functional configuration of the system for downloading a program according to the second embodiment will now be explained. FIG. 7 is a block diagram, which shows the functional configuration of the system for downloading a program according to the second embodiment. In FIG. 7, functions of components, except a re-downloading section 708 and a non-rewritable section 706a of a program storage (recording) section 706, will not be explained in detail because they are similar to those of the corresponding components in FIG. 5.

The download re-start section 708 reads the contents of a later-described download result storage section 708a when the power is turned on, and determines whether redownloading is required. The download re-start section 708 also writes onto the download result storage section 708a whether downloading executed has been completed to the end successfully. A later-described program for reading an EEPROM and a RAM 301 loaded with a program for reading the EEPROM, and a CPU 301a that executes the program loaded on the RAM 301c, of the engine controller 301, function as the download re-start section 708.

A download result storage section 708a stores whether the last downloading, that is, updating of a control program stored in the rewritable section 706b of the program storage (recording) section 706, has been completed to the end successfully. An EEPROM 301f of the engine controller 301 functions as the download result storage section 708a.

Various set values for the engine printer 302 such as a quantity of laser emission, a heating temperature during fixing of the toner, and the like as described above, are basically stored in the EEPROM 301f, and the remaining spare bit in the EEPROM 301f are utilized as the download result storage section 708a. More specifically, if the bit is, "1", that is, "on", it indicates that the last downloading abnormally ended, that is, the last downloading was interrupted halfway by accident such as a power disconnection, and if the bit is "0", that is, "off", it indicates that the last downloading was completed successfully. The download result storage section 708a corresponds to the "download result storage unit" claimed.

The non-rewritable section 706a of the program storage (recording) section 706 stores in addition to the above described programs, which are the program for receiving a program, the program for clearing the flash EEPROM, and the program for writing onto the flash EEPROM, a program for reading the EEPROM, and a program for writing onto the EEPROM, that are, the programs for writing and reading the downloading results stored in the download result storage section 708a.

Figure 8:
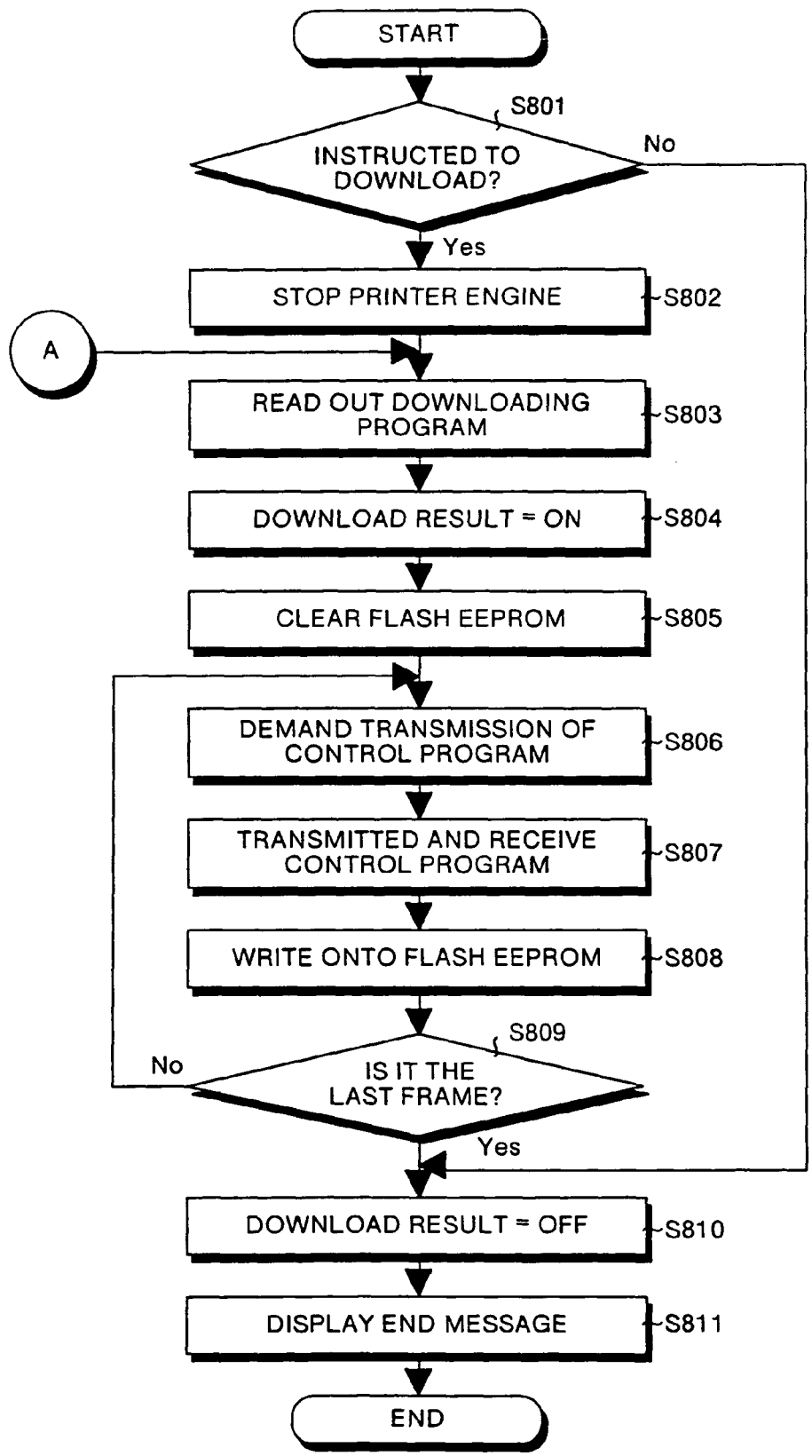
FIG. 8 is a flowchart, which shows steps of a procedure for downloading a program from a host computer 101 to a printer 102 according to the second embodiment.

Steps of a procedure of downloading a new program to the printer 102 from the host computer 101 according to the embodiment of the invention will now be explained. FIG. 8 is a flowchart, which shows the procedure of downloading a program to the printer from the host computer 101 according to the second embodiment.

Steps S801 and S802 are similar to the steps S601 and S602 in FIG. 6. In step S803, the program receiving section 703 reads out the program for receiving a program, the erasing section 704 reads out the program for clearing the flash EEPROM, the writing section 705 reads out the program for writing onto the flash EEPROM, and the download re-start section 708 reads out the programs for reading and writing on the EEPROM, respectively from the non-rewritable section 706a of the program storage (recording) section 706.

In step S804, the download re-start section 708, more specifically, the CPU 301a of the engine controller 301, switches "on", the download result storage section 708a, that is, the designated bit of the EEPROM 301f, according to the program for writing onto the EEPROM, the program which has been read out onto the RAM 301c in step S803.

The procedure indicated by steps S805 to S809 is similar to the steps S604 to S809 in FIG. 6. In step S810, the download re-start section 708 switches "off" the download result storage section 708a, that is, the designated bit of the EEPROM 301f, according to the program for writing onto the EEPROM. Finally in step S811, an end message is displayed by the display section 707 to end the procedure shown in the flowchart.

Figure 9:
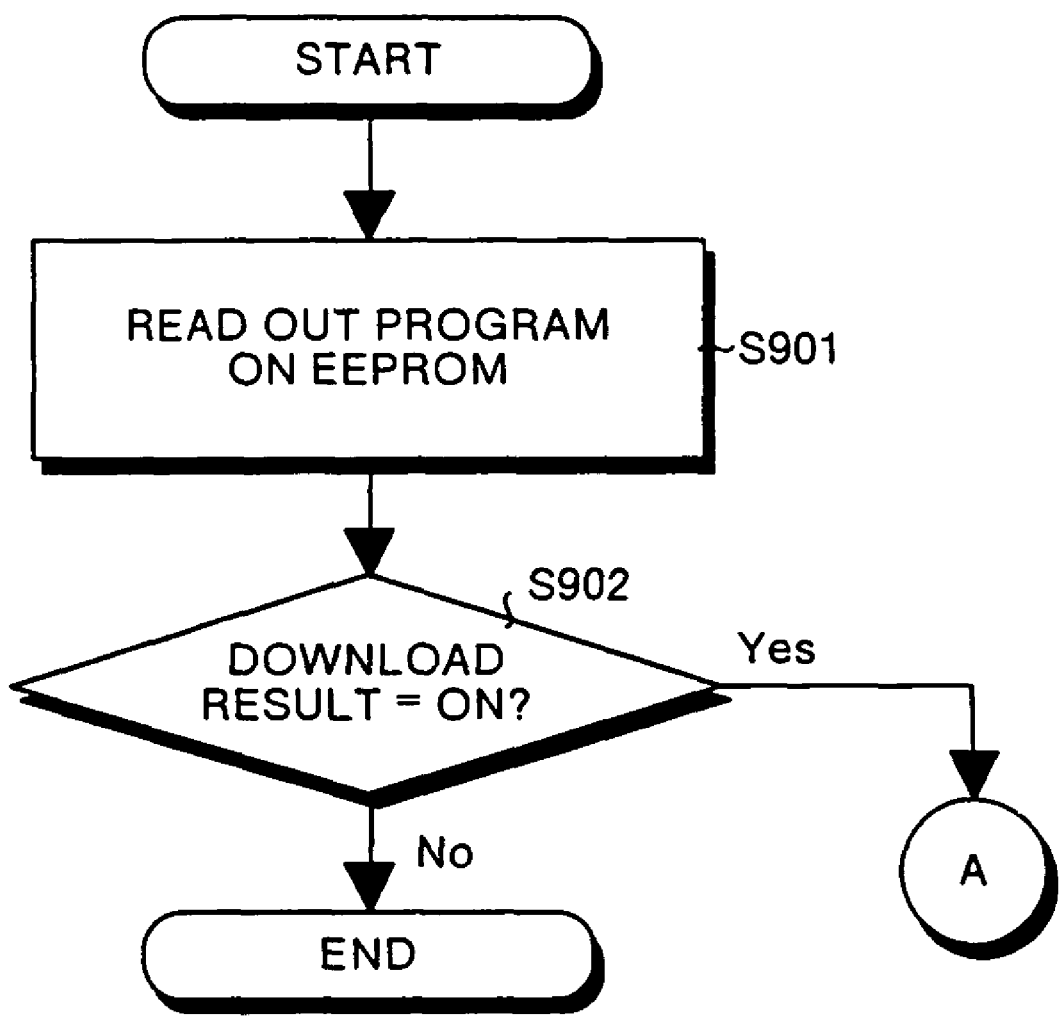
FIG. 9 is a flowchart, which shows steps of a procedure for automatically redownloading a program from the host computer 101 to the printer 102 according to the second embodiment.

Steps of the procedure of automatic redownloading according to the embodiment of the invention will now be explained. FIG. 9 is a flowchart, which shows steps of the procedure of automatic redownloading of a program to the printer 102 from the host computer 101 according to the second embodiment. The procedure shown in the flowchart is started as soon as the printer 102 is switched on.

In step S901, the download re-start section 708, more specifically, the CPU 310a of the engine controller 301, reads out onto the RAM 301c, the program for reading the EEPROM, the program that is stored in, the non-rewritable section 706a of the program storage (recording) section 706, that is, the boot area of the flash EEPROM 301b. The CPU 310a executes the program to determine whether the download result storage section 708a, that is, the designated bit in the EEPROM 301f is "on", in S902.

If the bit is "on" (i.e. step S902=Yes), it means that the last downloading abnormally ended, and thus the CPU 301a proceeds to the step S803 in FIG. 8 to execute redownloading. In the case of redownloading immediately after switching on the power, a stopping step S802 is not required since the components of the printer engine 302 are not driven yet.

On the contrary, if the bit is "off" (i.e. step S902=No), it means that the last downloading was completed successfully, and thus the procedure shown in the flowchart can be ended, to proceed to the usual startup steps such as warm-up of the components of the printer engine.

If the power is turned off for example due to a blackout or the like during steps S805 to S809 FIG. 8, the designated bit in the EEPROM 301f will not be switched "off" in step S810, and therefore remains "on". As a result, when the power is turned on the next time, it is determined in step S902 in FIG. 9 that redownloading is required, and the procedure from steps S803 are to be repeated. If this redownloading is successfully completed, the bit is switched "off" in step S810, such that redownloading will not be executed any more when the power is turned on the next time.

As explained above, according to the second embodiment, even if the control program in the printer 102 is erased and damaged due to a system crash during the updating process of the control program, downloading of the control program is restarted automatically after the system recovers. Therefore the operator is not required to input an instruction to download again.

If for example, a power disconnection occurs after writing onto the flash EEPROM 301b is completed and before the end message is displayed on the control panel 303 (i.e. during a time between the steps S809 and S811 in FIG. 8), redownloading is not required, however, the operator would not know whether redownloading is necessary, as he/she is not able to distinguish the power disconnection from a power disconnection that occurs in the middle of writing. However, if the apparatus is to determine whether redownloading is required, as described in the second embodiment, unnecessary downloading will not be repeated.

The automatic redownloading is achieved by utilizing the spare memory in the EEPROM 301f that stores various set values of the printer engine 302. As a result, no extra costs of providing an extra memory on the board of the engine controller 301 or the like is spent, realizing the automatic redownloading with a similar hardware to that in the conventional technology.

According to the second embodiment, if the last updating process abnormally ended, the same process is to be repeated from the beginning after the system recovers, however, if most of the program has been downloaded before the abnormal ending of the last downloading, it is a lot of waste of time and energy to receive and write the already downloaded part of the program again. Thus, redownloading may be started from the point where the last downloading failed, like in a third embodiment explained below.

A configuration of a system for downloading a program according to the third embodiment will not be explained in detail because the configuration is similar to that of the first embodiment shown in FIG. 1. Hardware configurations of a host computer 101 and a printer 102 composing the system will not be explained in detail because they are also similar to those respectively shown in FIGS. 2, 3, and 4.

A functional configuration of the system for downloading a program according to the third embodiment is similar to that of the second embodiment shown in FIG. 7, except in that the contents stored in the download result storage section 708a is different. In other words, the download result storage section 708a according to the third embodiment, stores, up to which number of frames of the new control program has been received by the program receiving section 703 in the last downloading.

That is, the download result storage section stores, up to which number of frames of the program had been received before the last downloading failed. A plurality of spare bits in the EEPROM 301f function as the download storage section 708a.

Since the contents of the download result storage section 708a differs from that of the second embodiment, the program for reading the EEPROM and the program for writing onto the EEPROM which are stored in the non-rewritable section 706a of the program storage (recording) section 706 also differ a little in formats such as numbers of bits to be used and the like.

Figure 10:
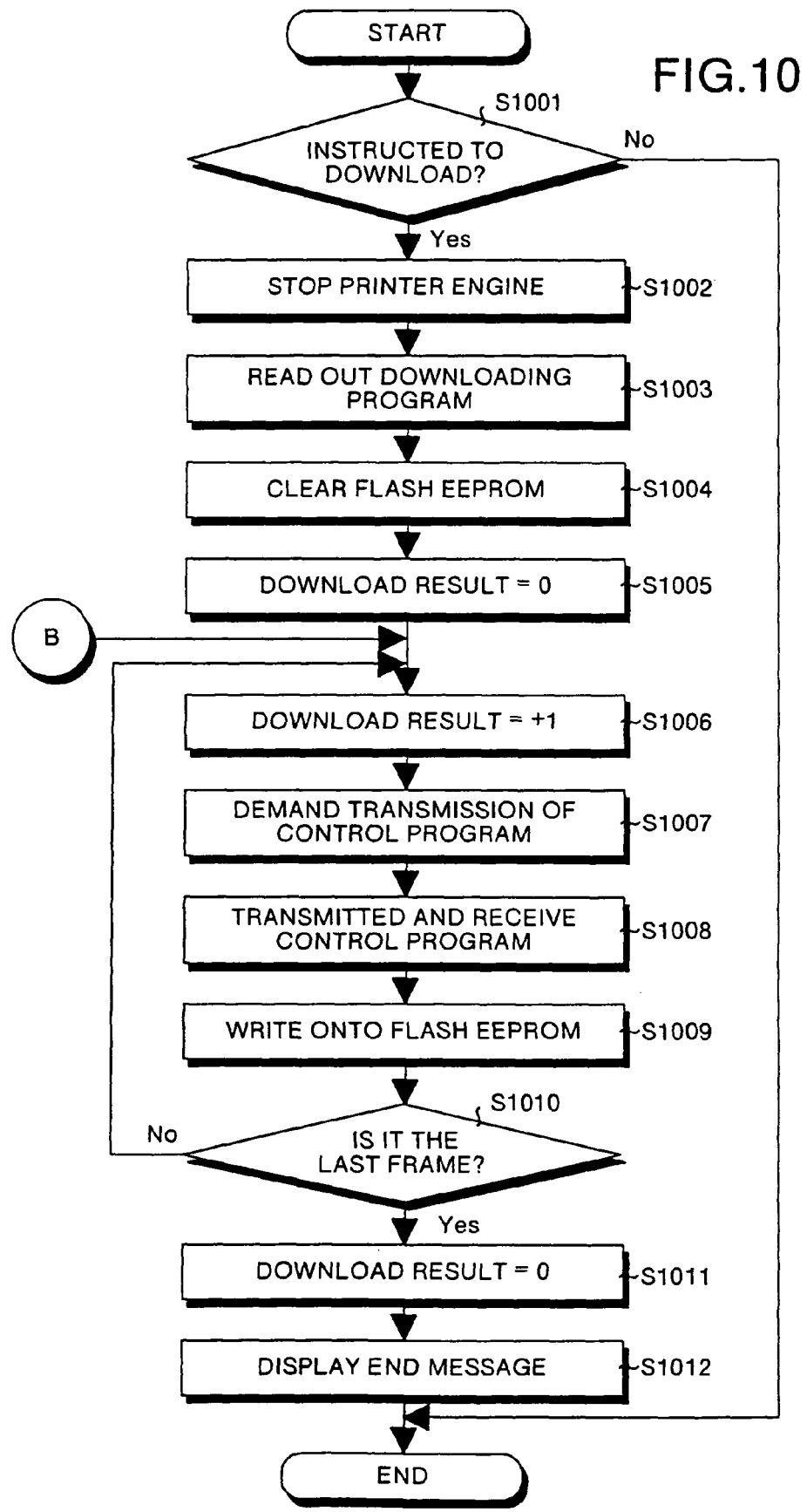
FIG. 10 is a flowchart, which shows steps of a procedure for downloading a program from a host computer 101 to a printer 102 according to a third embodiment.

Steps of a procedure for downloading a new control program from the host computer 101 to the printer 102 according the embodiment of the invention will now be explained. FIG. 10 is a flowchart, which shows steps of the procedure for downloading a program from the host computer 101 to the printer 102 according to the third embodiment.

Steps S1001 to S1004 are similar to the steps S801 to S803 and S805 in FIG. 8. In step S1005, the download re-start section 708, more specifically, the CPU 301a of the engine controller 301, switches the value of a designated area in the download result storage section 708a, that is, in the EEPROM 301f, to "0", according to the program for reading the EEPROM, which has been read out onto the RAM 301c in step S1003.

In step S1006, the download re-start section 708 reads out the value of the designated area in the download result storage section 708a, that is, the EEPROM 301f, according to the program for reading the EEPROM and the program for writing onto the EEPROM, increments the value by 1, and then writes the incremented value back onto the same area.

In step S1007, the program receiving section 703 demands the program transmission section 701 to transmit the frame numbered with the number stored in the download result storage section 708a at that time, out of the frames that are stored in the program storage section. For example, if the value stored in the download result storage section 708a equals "1", the program receiving section 703 demands the program transmission section 701 to transmit the first frame of the control program.

Accordingly, in step S1008, the program transmission section 701 transmits the frame demanded, to the program receiving 703. In step S1009, the writing section 705, similarly to step S808 in FIG. 8, sequentially writes the received frame onto the rewritable section 706b of the program storage (recording) section 706.

In step S1010, if it is determined that the last frame has been reached, similarly to step S809 in FIG. 8, in step S1011, the download re-start section 708 switches the value of the download result storage section 708a to "0". After an end message is displayed by the display section 707 in step S1012, the procedure in the flowchart ends.

Figure 11:
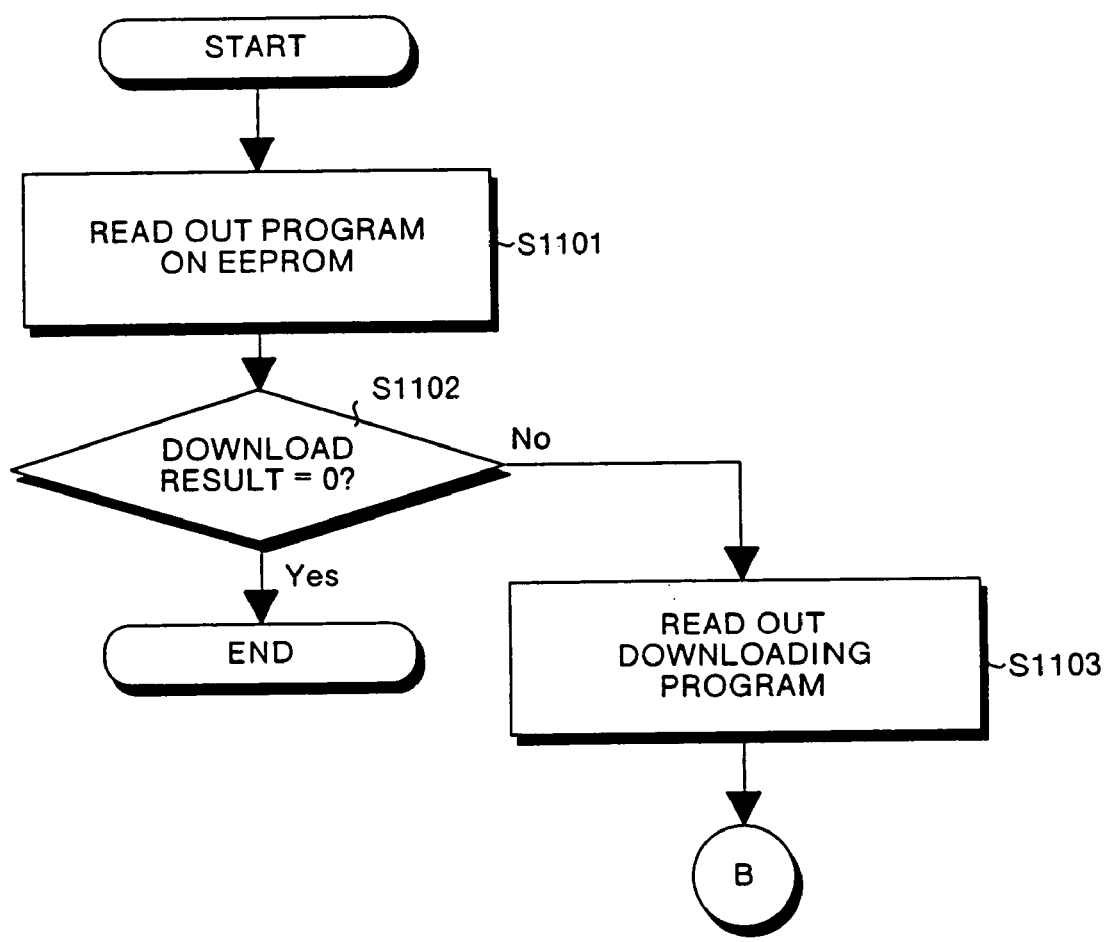
FIG. 11 is a flowchart, which shows steps of a procedure for automatically redownloading a program from the host computer 101 to the printer 102 according to the third embodiment.

Steps of a procedure for automatically restarting downloading according to the embodiment of the present invention will now be explained. FIG. 11 is a flowchart, which shows the procedure for automatically restarting downloading of a program from the host computer 101 to the printer 102 according the third embodiment. As soon as the printer 102 is switched on, the procedure according to the flowchart is started.

In step S1101, the download re-start section 708, more specifically, the CPU 301a of the engine controller 301, reads out onto the RAM 301c, the program for reading the EEPROM, the program that is stored in, the non-rewritable section 706a of the program storage (recording) section 706, that is, the boot area of the flash EEPROM 301b. When the program for reading the EEPROM is executed, it is determined whether the value of the designated area in, the download result storage section 708a, that is, the EEPROM 301f, is "0" in step S102.

If the value of the area equals "0" (i.e. step S1102=Yes), it means that the last downloading successfully ended, and thus the procedure according to the flowchart ends, to perform the usual startup steps such as warm-up of the components of the printer engine 302, and the like.

If the value of the area is not "0" (i.e. step S1102=No), it means that the last downloading was not completed successfully, and thus the CPU 301a proceeds to step S1103. In step S1103, the program receiving section 703 reads out the program for receiving a program, the writing section 705 reads out the program for writing onto the flash EEPROM, the download re-start section 708 reads out the program for reading the EEPROM and the program for writing onto the EEPROM, respectively from the non-rewritable section 706a of the program storage (recording) section 706. After that, the CPU 301a proceeds to step S1006 in FIG. 10, and downloads the rest of the program, which could not be obtained the last time.

If, for example, during the steps S1006 to S1010 in FIG. 10, there is a power disconnection caused by a blackout or the like, the value of the designated area in the EEPROM 301f remains a value other than "0", since the designated area is not reset to "0" in the step S1011. For example, if the program has been received up to the fifth frame before the disconnection, the value remains "5". As a result, when the power is turned on the next time, it is determined that further downloading in the step S1102 is required such that receiving and writing from the fifth frame in the steps S1006 and after are carried out. If this downloading is completed successfully, the value "0" is written onto the designated area in the step S1011 such that further downloading will not be executed the next time the power is turned on.

As explained above, according to the third embodiment, even if there is a system crash during the update process of the control program, and the control program in the printer 102 is erased or damaged, the result of the last downloading can be utilized after the system is fixed, such that only the part that could not be downloaded will be received and written again. As a result, with the minimum amount of workload, failure of the last downloading can be recovered.

In the above-described first to third embodiments, the computer is used to transmit the program, however, an IC card inserted into an IC card slot may be used instead for example. Further, the printer is used to receive the program, however, any apparatus including a program, for example, a copier, a facsimile machine, a household electric appliance, or of course a personal computer, may be used instead.

If for example the present invention is utilized in a personal computer, the BIOS usually stored in the ROM can be rewritten into a new BIOS downloaded from a server in real time. In the embodiments, the transmitter and the receiver are connected via a LAN, however, if there is a communication facility that corresponds with both of them, they may be connected via a WAN such as the Internet.

In the first to third embodiments, downloading of a program is not carried out until the instruction is input from the control panel 303 of the printer 102. However, a program for example which checks the context of the time stamps of the control program stored in the host computer 101 and the control program stored in the printer, regularly or every time the power is turned on, may be provided in the printer 102, such that if the program in the host computer 101 is newer, downloading of the program starts automatically.

If such a function for automatically updating the stored program is provided in the printer, there is a greater possibility that the operator may turn off the power accidentally without noticing the message such as "updating control program" displayed on the control panel. However, according to the invention, downloading is automatically restarted when the power is turned on the next time, such that no extra trouble is caused on the operator, and no crucial damage is caused to the apparatus like it used to be.

In the second and the third embodiments, the download result storage section 708a is provided in the printer 102, however, the section 708a may be provided in the host computer 101 instead. That is, in the latter case, the host computer 101 stores whether the program has been transmitted to the end, or how far the program has been transmitted. In this case, the program transmission section 701 of the host computer 101 refers to the download result storage section 708a, and if the last downloading was unsuccessful, transmits the program to be downloaded from the beginning, or only the rest of the program that could not be downloaded, to the program receiving section 703 of the printer 102.

The methods of downloading and of automatically redownloading a program described in the first to third embodiments are realized by the CPU, which executes the programs stored in the flash EEPROM. However, the programs to be executed by the CPU may be stored in a computer readable recording medium, for example, in an HD, an FD, a CD-ROM, an MO, a DVD, an IC card, or the like, instead of a ROM, to be read out and executed on the computer. These programs may be distributed via a network such as the Internet using the recording medium.

As explained above, according to the present invention, the programs for executing the downloading will not be erased even if the downloaded program is overwritten by a newly downloaded program for download. Therefore, even if the power is accidentally turned off during downloading of a program, downloading of the program can be automatically restarted and completed when the power is turned on the next time.

Furthermore, a program for executing erasing of contents of the first recording section is stored. Moreover, the program for download stored in the first recording section is erased according to the program for executing the erasing. Moreover, the program for download is written onto the first recording section after erasing the existing downloaded program.

Furthermore, information regarding to what extent the program for download has been written by the writing unit is stored. As a result, the state of downloading can be checked later as a reference to be used when re-downloading is executed.

Furthermore, information regarding whether the program for download has been completely written onto the first recording section is stored. As a result, the download result storage unit indicates whether or not the last downloading was successful, that is, whether or not re-downloading is necessary.

Furthermore, if the last downloading of the program for download was a failure, the program for download can be executed from the beginning.

Furthermore, information regarding to what extent the program for download has been downloaded is stored. As a result, the state of downloading can be checked later as a reference to be used when re-downloading is executed. Furthermore, information regarding up to which part of the program for download has been downloaded is stored. As a result, it can be decided whether or not re-downloading is necessary, and also from which part of the program to restart receiving.

Furthermore, information regarding up to which part of the program for download has been downloaded is stored. As a result, only a part of the program for download that was not downloaded properly in the earlier try can be downloaded.

Furthermore, information regarding up to what number of frames of the program for download have been downloaded is stored. As a result, it can be decided whether or not the last downloading was successful, and if it was not, then from which frame to restart downloading of the program for download.

Furthermore, the first recording section is a flash EEPROM. As a result, rewriting of the program can be readily executed.

Furthermore, the first recording section is realized by a boot area of the flash EEPROM and the second recording section is realized by an area excluding the boot area. As a result, both the program for download and the programs for executing that downloading can be stored in the same flash EEPROM.

The computer readable recording medium according to the present invention stores a computer program containing instruction which when executed on a computer realizes the method according to the present invention. Thus, the method according to the present invention can be realized easily and automatically.

The present document incorporates by reference the entire contents of Japanese priority document, 2000-372992 filed in Japan on Dec. 7, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for downloading a program for download from a computer connected to a network, the apparatus comprising:
   a first recording area onto which the program for download is writable and rewritable;
   a receiving unit configured to receive the program for download; and
   a second recording area configured to store a status of writing of the program for download received by the receiving unit, the second recording area being written on the first recording area, wherein
   the program for download is writable and rewritable in the first recording area, without being rewritable in the second recording area.

2. The apparatus according to claim 1, wherein rewriting of the status of writing of the program for download recorded in the second recording area is inhibited.

3. The apparatus according to claim 1, further comprising:
   an erasing unit configured to erase an existing program for download stored in the first recording area according to a program for executing erasing of contents of the first recording area, the program for executing erasing being stored in the second recording area; and
   a writing unit configured to write the received program for download onto the first recording area from which the existing program for download has been erased by the erasing unit, according to the program for executing erasing.

4. The apparatus according to claim 1, wherein the second recording area stores, as the status of writing, information regarding whether or not the program for download has been written onto the first recording area to an end.

5. The apparatus according to claim 1, wherein the receiving unit receives the program for download again from the computer according to the program for executing the reception, when information that a writing unit has not written the program for download to an end onto the first recording area has been stored in the second recording area.

6. The apparatus according to claim 1, further comprising a download result storage unit configured to store information regarding a status of the receiving of the program for download by the receiving unit.

7. The apparatus according to claim 1, wherein the second recording area stores information regarding up to which part of the program for download the receiving unit has received.

8. The apparatus according to claim 6, wherein when information that the receiving unit has received a part of the program for download has already been stored in the download result storage unit, the receiving unit receives the rest of the program for download according to the program for executing the reception.

9. The apparatus according to claim 1, wherein information regarding up to what number of frames of the program for download the receiving unit has received is stored on the second recording area.

10. A system for downloading a program for download, the system comprising:
    a host computer that includes a transmission unit which transmits the program for download; and
    an apparatus that downloads the program for download transmitted from the host computer, the apparatus including,
      a first recording area onto which the program for download is writable and rewritable,
      a receiving unit configured to receive the program for download, and
      a second recording area configured to store a status of writing of the program for download received by the receiving unit, the second recording area being written on the first recording area, wherein
    the program for download is writable and rewritable in the first recording area, without being rewritable in the second recording area.

11. A computer readable recording medium configured to store computer executable instructions for executing a method of downloading a program for download, the method being executed on an apparatus that downloads the program for download from a host computer, the apparatus being connected to the host computer via a network, the method comprising:
    receiving the program for download from the host computer according to a program for executing reception of the program for download, the program for executing reception being stored in a second recording area provided in a predetermined area of a first recording area that is writable and rewritable with the program for download, the second recording area storing, in advance, at least the program for executing reception and a program for executing writing of the program for download onto the first recording area; and
    writing the received program for download onto the first recording area, according to the program for executing the writing that is stored in the second recording area, wherein
    rewriting of the at least the program for executing reception and the program for executing writing stored in the second recording area is inhibited, and
    the program for download is writable and rewritable in the first recording area, without being rewritable in the second recording area.

* * * * *

UNITED STATES PATENT AND TRADEMARK OFFICE
CERTIFICATE OF CORRECTION

| | | |
|---|---|---|
| PATENT NO. | : 8,020,159 B2 | Page 1 of 1 |
| APPLICATION NO. | : 11/586569 | |
| DATED | : September 13, 2011 | |
| INVENTOR(S) | : Yoshiaki Hanyu | |

It is certified that error appears in the above-identified patent and that said Letters Patent is hereby corrected as shown below:

On the title page, Item (30), the Foreign Application Priority Data should read:

-- (30)    Foreign Application Priority Data

Dec. 7, 2000    (JP) ............................ 2000-372992 --

Signed and Sealed this
First Day of November, 2011

David J. Kappos
*Director of the United States Patent and Trademark Office*